United States Patent
Mathis

(10) Patent No.: US 7,747,372 B2
(45) Date of Patent: Jun. 29, 2010

(54) SYSTEMS AND METHODS FOR USER CONTROL OF VEHICULAR TRANSMISSION SHIFT POINTS

(75) Inventor: Kenneth Michael Mathis, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 364 days.

(21) Appl. No.: 11/824,795

(22) Filed: Jul. 3, 2007

(65) Prior Publication Data

US 2009/0012682 A1    Jan. 8, 2009

(51) Int. Cl.
*G06F 19/00* (2006.01)

(52) U.S. Cl. ............... 701/52; 701/1; 701/51; 701/53; 701/54; 701/59; 74/335; 74/336 R; 74/473.18; 477/107; 477/109; 477/110; 477/111; 477/154

(58) Field of Classification Search ............ None
See application file for complete search history.

(56) References Cited

U.S. PATENT DOCUMENTS

| | | | |
|---|---|---|---|
| 4,350,058 A * | 9/1982 | Miller et al. | 477/154 |
| 4,458,318 A * | 7/1984 | Smit et al. | 701/51 |
| 4,493,228 A * | 1/1985 | Vukovich et al. | 477/109 |
| 4,555,959 A | 12/1985 | Braun | |
| 4,564,906 A | 1/1986 | Stephan et al. | |
| 4,846,283 A * | 7/1989 | Batcheller | 172/10 |
| 4,975,845 A * | 12/1990 | Mehta | 701/59 |
| 4,998,200 A * | 3/1991 | Glowczewski et al. | 701/51 |
| 5,031,100 A * | 7/1991 | Takahashi | 701/55 |
| 5,406,861 A * | 4/1995 | Steeby | 74/336 R |
| 5,459,658 A * | 10/1995 | Morey et al. | 701/56 |
| 5,680,307 A | 10/1997 | Issa et al. | |
| 6,308,124 B1 * | 10/2001 | Kresse et al. | 701/53 |
| 6,405,611 B1 * | 6/2002 | DeJonge et al. | 74/335 |
| 7,001,308 B2 | 2/2006 | Henneken et al. | |
| 2004/0129100 A1 * | 7/2004 | Zimmermann et al. | 74/335 |
| 2005/0049772 A1 * | 3/2005 | Liu | 701/54 |
| 2006/0162476 A1 * | 7/2006 | Zimmermann et al. | 74/335 |

* cited by examiner

*Primary Examiner*—Khoi Tran
*Assistant Examiner*—Jonathan Sample
(74) *Attorney, Agent, or Firm*—Dinsmore & Shohl LLP

(57) ABSTRACT

Systems and methods for user control of vehicular transmission shift points. In one embodiment, a user may control a transmission shift point by adjusting a selector having non-discrete selectable positions. Such selector may generate a signal indicative of its position to a transmission controller. The transmission controller may receive the signal from the selector and determine at least one transmission shift point based upon the selector position. The transmission controller may thereby control the transmission to effectuate a gear change when the shift point is achieved. In some embodiments, the selector may comprise a rotary potentiometer, a rotary encoder, an inline potentiometer, an inline encoder or the like.

19 Claims, 11 Drawing Sheets

SYSTEMS AND METHODS FOR USER CONTROL OF VEHICULAR TRANSMISSION SHIFT POINTS

TECHNICAL FIELD

This invention generally relates to systems and methods for user-controlled non-discrete selection of transmission shift points. More specifically, one embodiment relates to a transmission system with a user controlled selector having non-discrete selectable outputs and configured to adjust at least one transmission shift point based upon the selector.

BACKGROUND

Generally, transmission control systems may be provided in a vehicle to effectuate transmission gear change (i.e., upshift or downshift) at particular intervals called shift points. These shift points may be selected by monitoring various vehicle conditions (i.e., acceleration, road grade, accelerator depression, speed, etc.) and calculating a shift point to minimize transmission gear "hunting", overrunning or misshifting. A user may, however, select or adjust the shift points to dynamically personalize vehicle performance. Typically, a user may control a shift point by adjusting a selector. In one such system, the selector may provide selection of shift points from a finite set of shift points (i.e., a discrete selector). However, such systems are inflexible and limited in the programmability they can provide. In another such system, the selector may only provide instantaneous selection of a shift point (i.e., shifting immediately when a shifting mechanism is engaged). However, such systems do not allow for setting or programming shift points. Accordingly, there is a need for systems and methods that have greater flexibility and allow for more user control. There is also a need for systems and methods that provide user-selectable shift points without a need for continual user interaction.

SUMMARY

According to one embodiment, a method for controlling a vehicle transmission having at least one shift point is provided. The method may comprise providing a user-controlled selector having non-discrete selectable positions and generating a signal indicative of the position of the selector. The method may further comprise determining at least one transmission shift point based upon the selector position and controlling a vehicle transmission such that a gear change is effectuated upon achieving the at least one adjusted shift point.

According to another embodiment, a method for selecting a shift point is provided. The method may comprise calculating at least one transmission shift point based upon at least one vehicle condition. The method may further comprise providing a user-controlled selector having non-discrete selectable positions and generating a signal indicative of the position of the selector. The method may additionally comprise adjusting the calculated shift point based upon the selector position.

According to another embodiment, a system for controlling at least one shift point of a transmission is provided. The system may comprise a transmission having gears and being configured to respond to at least one shift point for effectuating an automatic gear change. The system may further comprise a controller operable to establish the at least one shift point and to control the transmission such that the gear change is effectuated upon achieving the at least one shift point. The system may additionally comprise a user-controlled selector configured to allow the user to adjust at least one shift point of the controller, wherein the selector has non-discrete selectable positions.

BRIEF DESCRIPTION OF THE DRAWINGS

It is believed that the present invention will be better understood from the following description taken in conjunction with the accompanying drawings in which.

DETAILED DESCRIPTION OF ILLUSTRATIVE EMBODIMENTS

Figure 1:
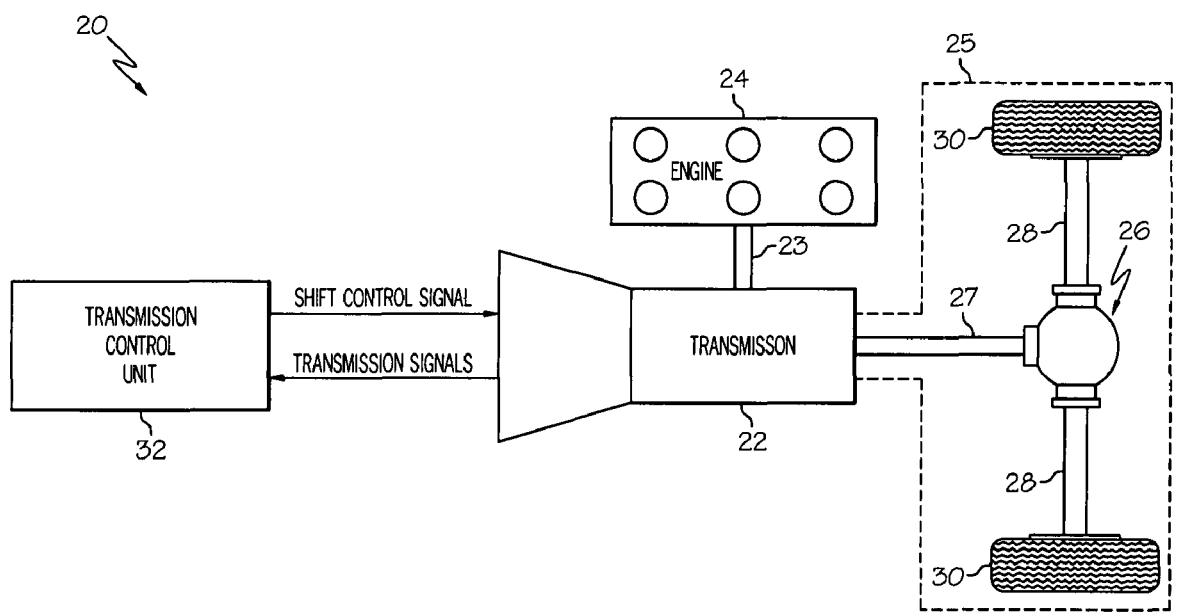
FIG. 1 is a schematic view of a transmission system in a vehicle in accordance with one illustrative embodiment of the present invention.

FIG. 1 illustrates a transmission system 20 which may be implemented in a vehicle. As illustrated, transmission system 20 may comprise a transmission control unit 32, a transmission 22 and a drivetrain 25. Transmission 22 may be connectedly engaged to an engine 24 through a drive member 23 such that engine 24 may provide rotational velocity to the transmission 22 by rotating drive member 23 at a given rotational velocity (revolutions per minute ("R.P.M.")). As discussed below, transmission 22 may be operable to change the rotational velocity provided by engine 24 and output such a changed rotational velocity. Transmission 22 may also be connectedly engaged to drivetrain 25 such that transmission 22 may drive the drivetrain 25 with changed output rotational velocity to thereby rotate wheels 30 of the vehicle.

In one embodiment, transmission 22 may be an automatic transmission commonly used in automobiles. Transmission 22 may comprise sets of selectable planetary gears capable of being selectively engaged to proportionally change the rotational velocity provided to transmission 22. Each proportional change associated with each planetary gear set may be defined as a particular gear ratio. For example, a planetary gear set having a gear ratio of 1:1 may provide engine rotational velocity directly to driveshaft 25 (i.e., one revolution per minute ("R.P.M.") of engine rotational velocity corresponds to one R.P.M. of drivetrain rotational velocity). Furthermore, a planetary gear set having a gear ratio of 3:1 may provide three times the engine rotational velocity to driveshaft 25 (i.e., one R.P.M. of engine rotational velocity corresponds to three R.P.M. of drivetrain rotational velocity). In addition, transmission 22 may comprise a torque converter to permit gear ratio to be alternatively selected during vehicle operation. In one embodiment, torque converter may momentarily disengage engine 24 from transmission 22 to permit a gear ratio change to occur. Of course, transmission 22 may be provided with particular planetary gear sets and gear ratios different from the embodiments described above. Furthermore, in other embodiments, other transmissions may be implemented such as a shift-assisted manual transmission.

As illustrated, drivetrain 25 may comprise a differential 26, a driveshaft 27 and axles 28 for providing rotational velocity from transmission 22 to wheels 30. In such an embodiment, rotational velocity from the transmission 22 may be provided to axles 28, through differential 26 and driveshaft 27 to wheels 30. It should be understood that such an embodiment is merely illustrative and other embodiments may be configured according to particular vehicle specifications or designs. For instance, drivetrain 25 may comprise two differentials 26, two driveshafts 27, and four axles 28 for providing rotational velocity from transmission 22 to four wheels 30, such as on a 4-wheel-drive vehicle. Furthermore, drivetrain 25 may be configured to drive any number of wheels such as six wheels (i.e., an ATV), four rear wheels (i.e., a tractor trailer), one wheel (i.e., a motorcycle) or any other number of wheels for driving a given vehicle. Consequently, it should also be understood that the configuration of drivetrain 25 is illustrative and may be configured according to particular vehicle specifications or designs. For instance, in some two wheel drive systems, transmission 22 may be connected directly to axles 28, thereby eliminating the need for driveshaft 27 and differential 26. Similarly, in some four-wheel vehicles, additional transmissions 22 may be implemented and connected directly to axles 28 thereby eliminating the need for driveshafts 27 and differentials 26.

Figure 2:
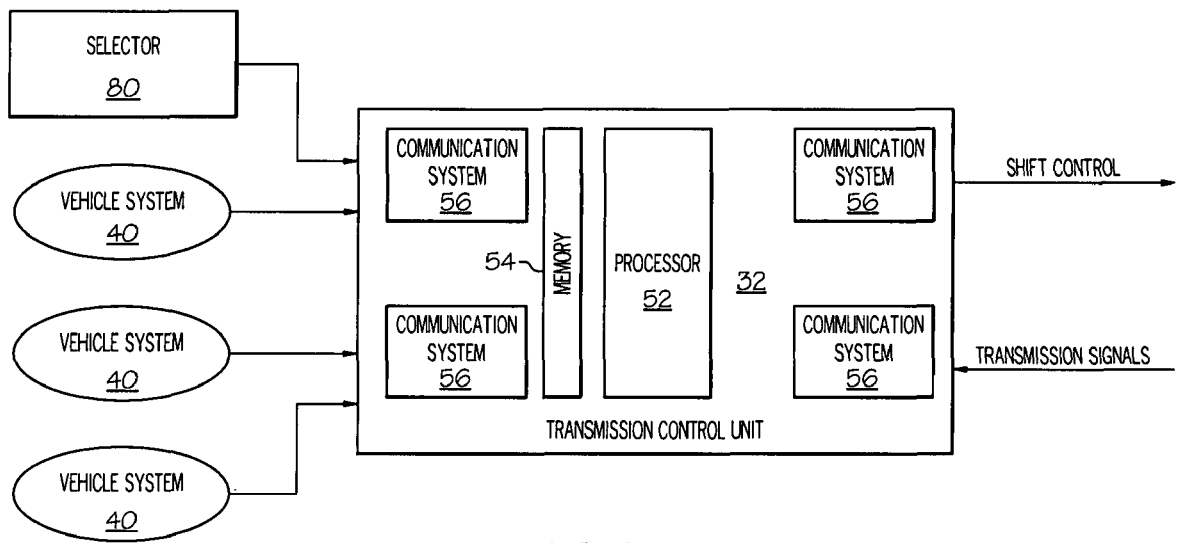
FIG. 2 is a block diagram of a transmission control unit for a transmission system that can be used in accordance with one illustrative embodiment of the present invention.

As illustrated in FIGS. 1 & 2, a transmission control unit 32 may be provided to control transmission 22 based upon vehicle condition data (i.e., vehicle data, transmission data, environmental data, user-provided data or any other data which may support transmission control). Transmission control unit 32 may be communicatively connected to transmission 22 to provide control signals to the transmission 22. Additionally and as shown in FIG. 2, transmission control unit 32 may be communicatively connected to a vehicle system 40 and/or a selector 80 for providing data supportive of transmission control to transmission control unit 32. In one embodiment, transmission control unit 32 may communicate using fiber-optic communication (i.e., drive-by-wire, ethernet, etc.). However, transmission control unit 32 may communicate using other communication forms such as wireless communication (i.e., Blue-tooth, radio frequency, etc.), microwave communication, infrared communication, analog communication, or the like. Additionally, transmission control unit 32 may communicate using common vehicle communication formats such as J1850, Nexus, SCI, SPI, CAN or the like.

As illustrated in FIG. 2, transmission control unit 32 may include at least one communication system 56, memory 54 and a processor 52 to process data. Communication system 56 may be operative to communicate with vehicle system 40 and may be operative to collect information and transmit such information to processor 52 and/or memory 54. Communication system 56 may communicate with vehicle systems using common vehicle communication formats such as J1850, Nexus, SCI, SPI, CAN or the like. In addition, communication system(s) 56 may communicate using similar communication methods and forms discussed for transmission control unit 32.

As illustrated, memory 54 may be included in transmission control unit 32 to provide data storage. Memory 54 may be any device capable of storing data such as random access memory, a CD drive, a hard drive, or any other data storage device now known or hereafter developed. In addition, processor 52 may be included in transmission control unit 32 to perform logical operations on data. Processor 52 may be any electronic device, controller, microprocessor, circuitry or chipset capable of performing operations on data, such as a Motorola HC12, a Motorola x86, a Texas Instruments z80 or the like. Processor 52 may be responsible for the data processing in transmission control unit 32. Processor 52 may also implement algorithms to support such processing via programs, firmware, fuzzy logic, neural networks or other electronic algorithms in accordance with a particular design. In addition, processor 52 may communicate using similar communication methods and forms discussed for transmission control unit 32.

Transmission control unit 32 may process data to calculate shift points, calculate control routines, calculate optimization schemes, perform error correction, calculate protection schemes or process data in any other manner to support transmission control. Transmission control unit 32 may be any electronic module or circuitry for processing data and controlling transmission such as an MPC 500 based microcontroller, a MC56F8300 series microcontroller, or any other transmission controller commonly known in the art. In one embodiment, transmission control unit 32 may calculate transmission shift points based upon vehicle condition data and control transmission 22 based upon such shift points. In another embodiment, transmission control unit 32 may provide shift inhibition routines by monitoring vehicle and environmental conditions such as braking, precipitation, temperature or wind speed to determine whether a transmission shift may cause undesirable vehicle performance. In yet another embodiment, transmission control unit 32 may control transmission 22 by querying a user to provide information and controlling transmission 22 based upon such information.

It should be understood that transmission control unit 32 is merely illustrative and that many other configurations are currently available. For instance, communication systems 56, memory 54 and a processor 52 may be implemented on the same chipset. Moreover, communication system(s) 56, memory 54 and a processor 52 may be supplemented with other devices, or may be configured to comply with a particular transmission system into which it is implemented. Accordingly, transmission control unit 32 may be configured according any vehicle configuration and/or transmission configuration and may control transmission 22 in any manner suitable for a particular design or configuration.

Still referring to FIG. 1, engine 24 may be connectedly engaged with transmission 22 through drive member 23 such that engine 24 may rotate drive member 23 at a given rotational velocity to provide rotational velocity to the transmission 22. Typically, engine 24 may be an internal combustion engine, but other embodiments may be provided such as a steam engine, an electric motor or the like. As is common in many vehicles, a user may selectively control vehicle speed by controlling the rotational velocity of the engine 24 (e.g., varying an engine throttle). In one embodiment, the user may vary engine rotational velocity by depressing an accelerator pedal. However in other embodiments, the user may vary the rotational velocity by engaging a knob, a lever, a trigger, or any other device for enabling a user to vary engine rotational velocity. As is common in vehicles, engine 24 may operate within a finite range of rotational velocities (e.g., 0-6,000 R.P.M.) capable of driving a vehicle at low speeds. Transmission 22 may proportionally change the rotational velocities provided by engine 24 by implementing the selectable gear ratios described above. In particular, engine 24 may operate within its finite range of rotational velocities for each gear ratio such that each particular gear ratio may correspond to a particular range of vehicle speed. For instance, engine rotational velocities for a first gear ratio may provide vehicle speeds from zero to ten miles per hour (M.P.H.), engine rotational velocities for a second gear ratio may provide vehicle speeds from ten M.P.H. to twenty M.P.H., engine rotational velocities for a third gear ratio may provide vehicle speeds from twenty M.P.H. to forty M.P.H., etc. It should be understood that other configurations are contemplated having any number of gear ratios, gear ratios having different ranges of speed or other gear ratio configurations suitable for corresponding engine rotational velocity to vehicle wheels.

Figure 3:
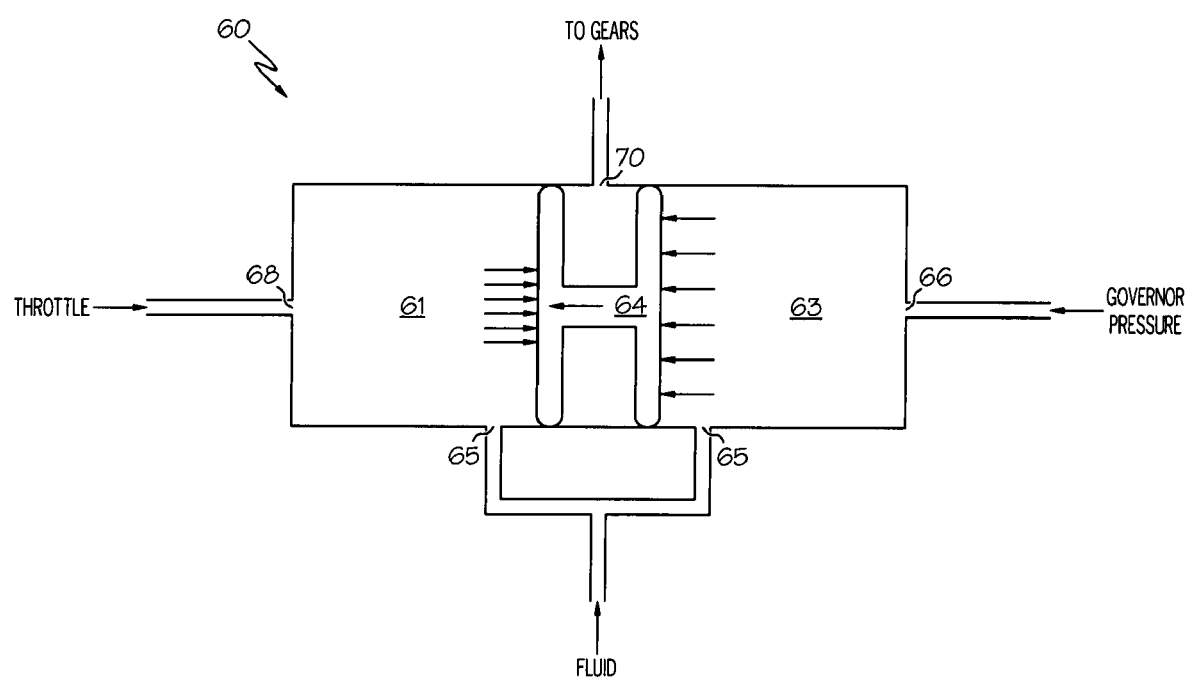
FIG. 3 is a schematic view of a shift controller that can be used for selecting shift points in accordance with one illustrative embodiment of the present invention.

As shown in FIG. 3, a shift controller 60 may provide hydraulic pressure to transmission 22 to select between gear ratios. As is common in transmissions, a gear ratio may be selected when a particular hydraulic pressure is achieved within the transmission 22. Shift controller 60 may regulate the flow of transmission media (i.e., automatic transmission fluid, transmission oil, hydraulic fluid, or the like) by controlling shift valve 44 to thereby select a particular shift point.

As a vehicle changes speeds, shift points may be selected to initiate gear ratio change(s). Shift points may be determined based upon vehicle conditions (i.e., engine rotational velocity, engine torque, vehicle speed, vehicle weight, acceleration, deceleration, environmental conditions, or road conditions and the like). Particular shift points may be assigned based upon limits associated with the conditions. When the limits of a particular condition are achieved (i.e., shift point achieved) a gear ratio change may occur. Shift points may be selected using calculation/selection methods now known or hereafter developed. In one embodiment, shift points may be calculated using predefined algorithms or programs or firmware associating shift points with particular condition limits. In another embodiment, shift points may be selected from a lookup table associating shift points with particular condition limits. In yet another embodiment, shift points may be selected from storage in a memory when a particular condition limit value is achieved. Various other embodiments are contemplated wherein shift points may be based upon conditions and may be calculated in manners which may comport with a particular vehicle or transmission configuration.

Figure 4:
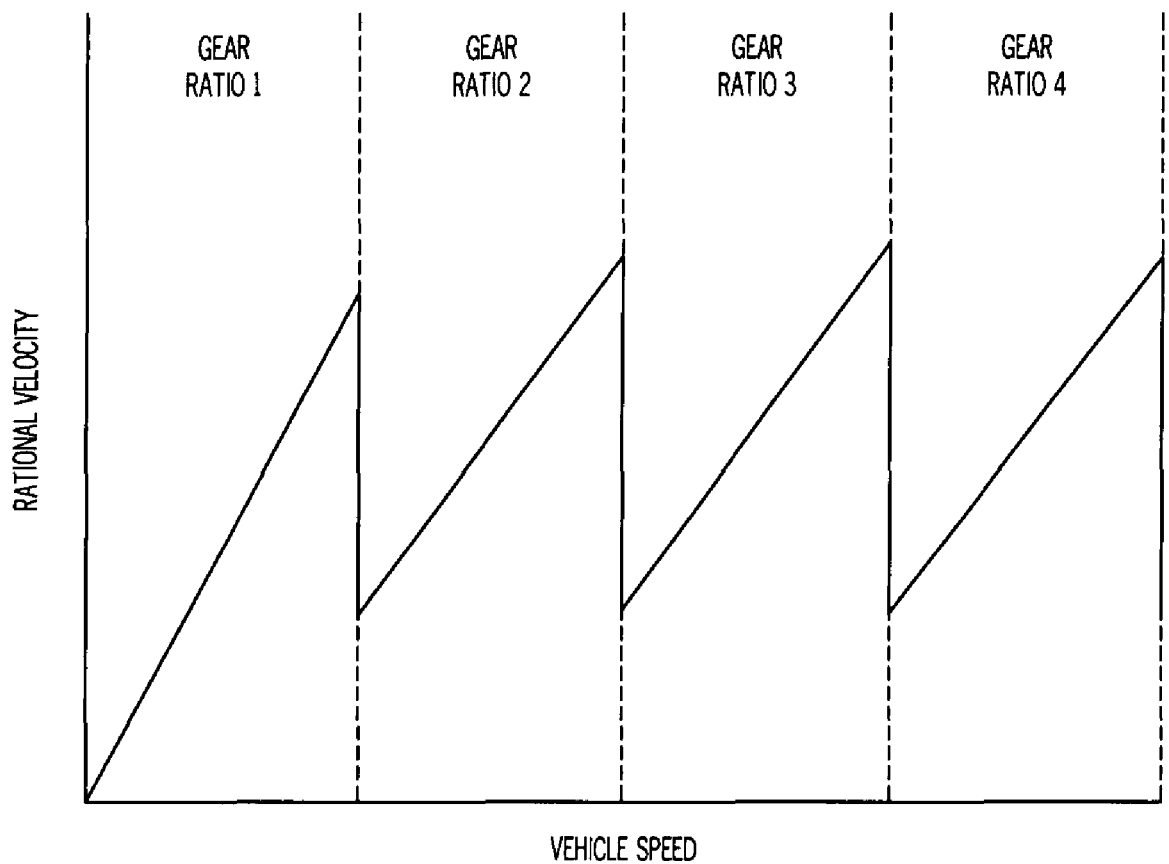
FIG. 4 is a graph depicting engine rotational velocity and vehicle speed as it relates to gear ratio selection in accordance with one illustrative embodiment of the present invention.

In one embodiment, a shift point may be determined based upon engine rotational velocity. As described above, the engine 24 may be capable of operation within a range of rotational velocities having an upper and lower limit (i.e., 0-6,000 R.P.M.). Shift points may be assigned based upon the upper and lower engine rotational velocity limits to ensure engine 24 operates within a given rotational velocity range during vehicle operation. For instance and as shown in FIG. 4, a shift point may be selected for an upper rotational velocity limit where, upon reaching the particular shift point (i.e., during vehicle acceleration), a higher gear ratio may be selected and the rotational velocity of engine 24 may be decreased (i.e., upshift). Conversely, a shift point may be selected for a lower rotational velocity limit where, upon reaching the particular shift point (i.e., during vehicle deceleration), a lower gear ratio may be selected and the rotational velocity of engine 24 may be increased (i.e., downshift). It should be understood that upper and lower rotational velocity limits may be breached as a vehicle accelerates or decelerates. Therefore, shift points may be selected for different gear ratios to ensure proper engine operation during vehicle acceleration and deceleration.

In another embodiment, a shift point may be determined based upon vehicle speed and accelerator depression. As a vehicle operates, a user may indicate a desire to accelerate a vehicle by depressing an accelerator pedal. Since vehicle acceleration may be easier to achieve at high engine rotational velocities, a particular shift point may be assigned to allow engine 24 to reach a high rotational velocity. For instance, substantial pedal depression may indicate a desire to quickly increase vehicle speed. A shift point may be assigned wherein gear change is delayed and engine 24 achieves a high rotational velocity to provide additional acceleration.

In such an embodiment shift controller 60 may provide transmission media to transmission 22 based upon vehicle speed and accelerator pedal depression. In such an embodiment, shift controller may comprise chambers 61 and 63 which may be isolated therebetween with shift valve 64. When the pressure in chamber 63 overcomes the pressure in chamber 61, shift valve 64 may be biased enough to provide media through gear opening 70. By providing media through gear opening 70, hydraulic pressure may be increased in transmission 22 and a gear change may occur (i.e., a shift point may be provided). Transmission media may be provided to chambers 61 and 63 through fluid openings 65 and may be maintained at a constant pressure. In such an embodiment, a governor (not shown) may provide transmission media to chamber 63, via governor opening 66, in correlation to the speed of the vehicle (e.g., additional transmission media may be added when vehicle speed increases). As vehicle speed changes, different volumes of transmission media in chamber 63 may bias shift valve laterally 64 within shift controller 60. Furthermore, a throttle (not shown) may provide transmission media to chamber 61, via throttle opening 68, in correlation to the amount of depression on the pedal (e.g., additional transmission media may be added when accelerator pedal is increasingly depressed). As pedal depression changes, different volumes of transmission media in chamber 61 may bias shift valve 64 laterally within shift controller 60. When the pressure in chamber 63 overcomes the pressure in chamber 61, shift valve 64 may be biased enough to provide media through gear opening 70 to thereby increase transmission hydraulic pressure.

It should be understood that shift controller 60 is merely illustrative and other embodiments are contemplated. For instance, the shift valve 64 in shift controller 60 may be electronically controlled. In such an embodiment, vehicle conditions may be monitored to determine whether a transmission shift is appropriate. When the logic appropriate shift point is determined (i.e., through algorithms, lookup tables stored in memory or the like), shift valve 64 may be controlled to regulate transmission media through gear opening 70.

As illustrated in FIG. 2, at least one vehicle system 40 may be provided to transmit vehicle condition data (i.e., vehicle information, environmental information, transmission information, user information or the like) to transmission control unit 32. In one embodiment, vehicle system 40 may be a road condition sensor. In another embodiment, vehicle system 40 may be a torque sensor. However, vehicle system 40 may be any system operative to transmit vehicle condition data including an electronic control unit, a vehicle condition sensor, a diagnostic unit or any other system now known or hereafter developed. In addition, vehicle system 40 may communicate with transmission control unit 32 using the particular communication methods and forms discussed for transmission control unit 32 below.

Figure 8A:
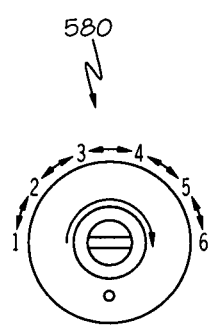
FIGS. 8A & 8B are a rotatable selector having non-discrete selectable positions about a given range and a corresponding graph depicting correlation between selector position and shift point selection in accordance with one illustrative embodiment of the present invention.
Figure 8B:
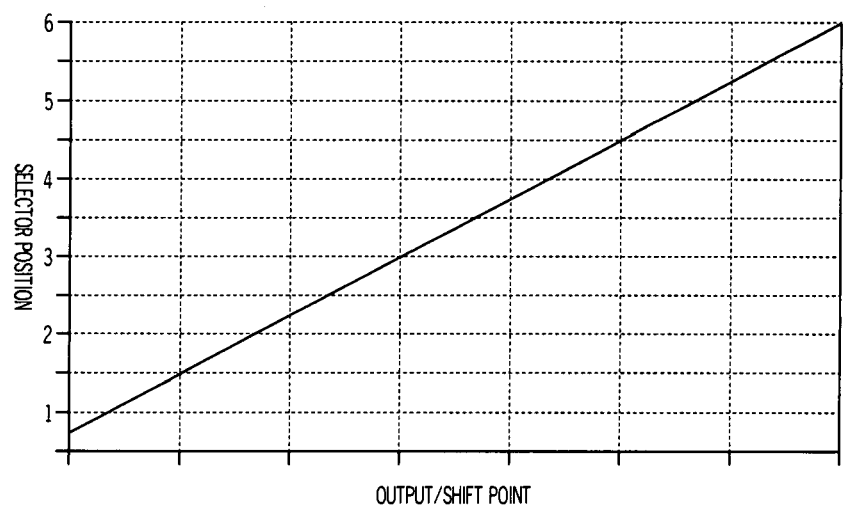

As further illustrated in FIG. 2, at least one selector 80 may be provided to permit a user to adjust a transmission shift point (further discussed below) within transmission control unit 32. Selector 80 may any device which has continuously variable positions such as a continuously variable potentiometer, a continuously variable encoder or the like. In addition, selector 80 may be operable provide non-discrete outputs about a given range as shown in FIG. 8. Consequently, it is not necessary that outputs from selector 80 have infinite gradation through a range to be non-discrete outputs. Rather, the gradation should be substantially infinite and thereby seem non-discrete about a given range (i.e., 1/10000 gradation).

Figure 5A:
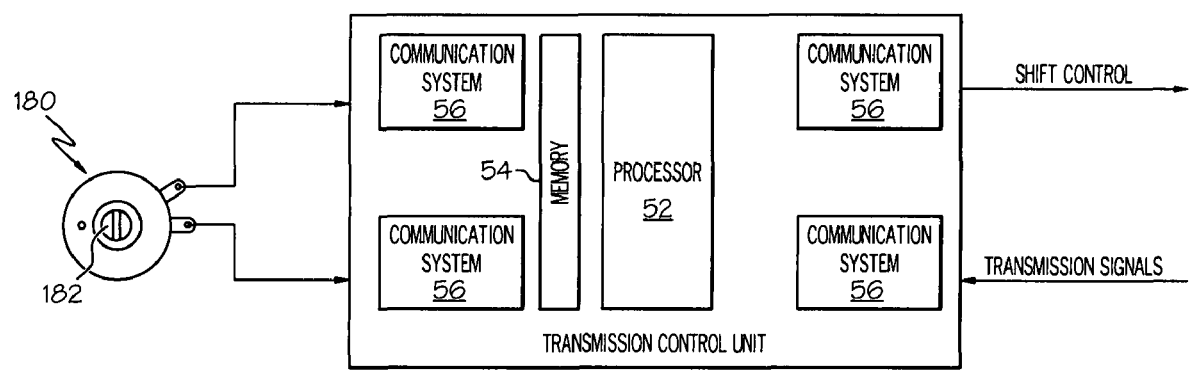
FIG. 5A is a top view of a rotatable transmission shift point selector system in accordance with one illustrative embodiment of the present invention.
Figure 5B:
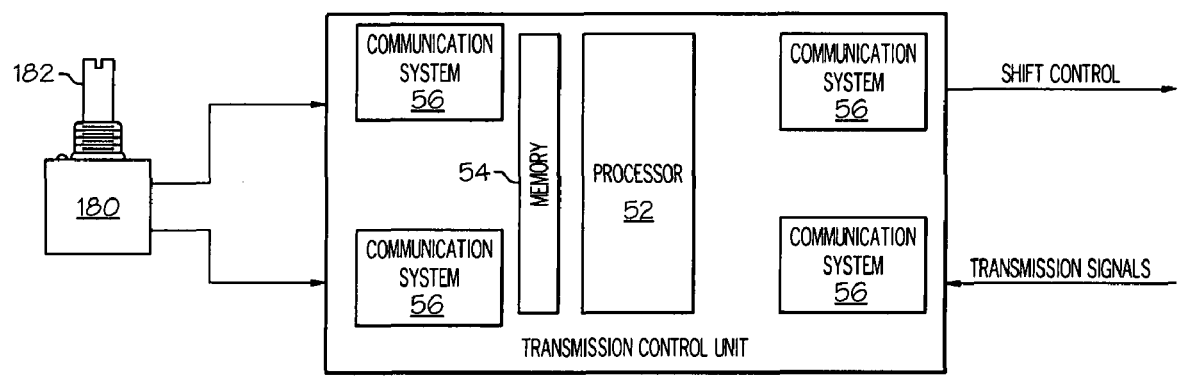
FIG. 5B is a side view of a rotatable transmission shift point selector system in accordance with one illustrative embodiment of the present invention.
Figure 6:
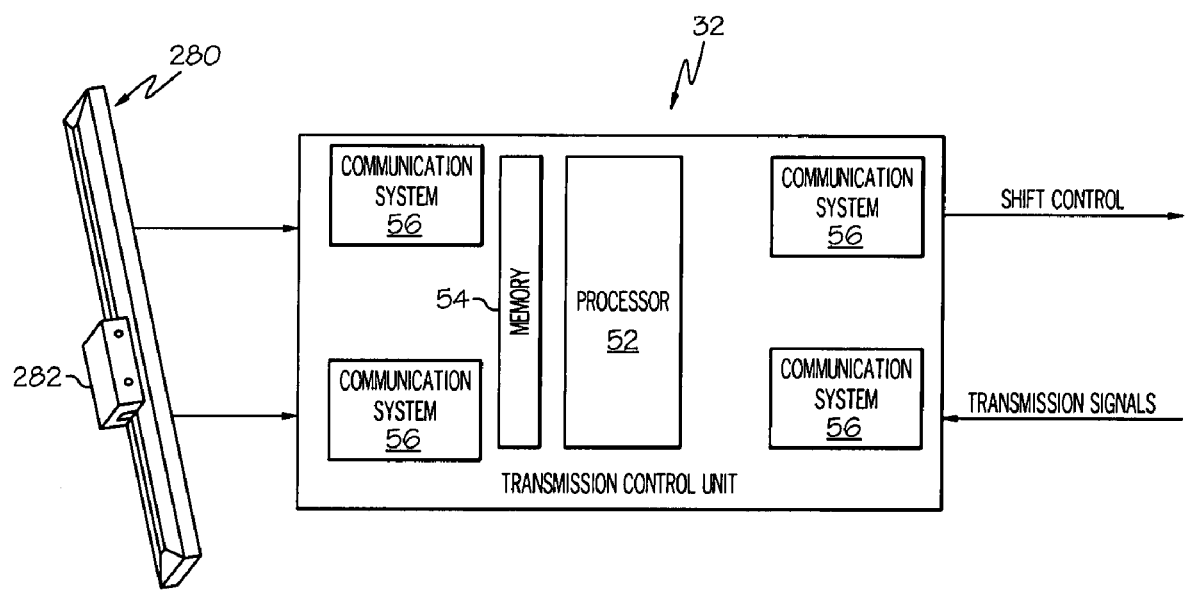
FIG. 6 is a top view of an in-line transmission shift point selector system in accordance with one illustrative embodiment of the present invention.
Figure 7:
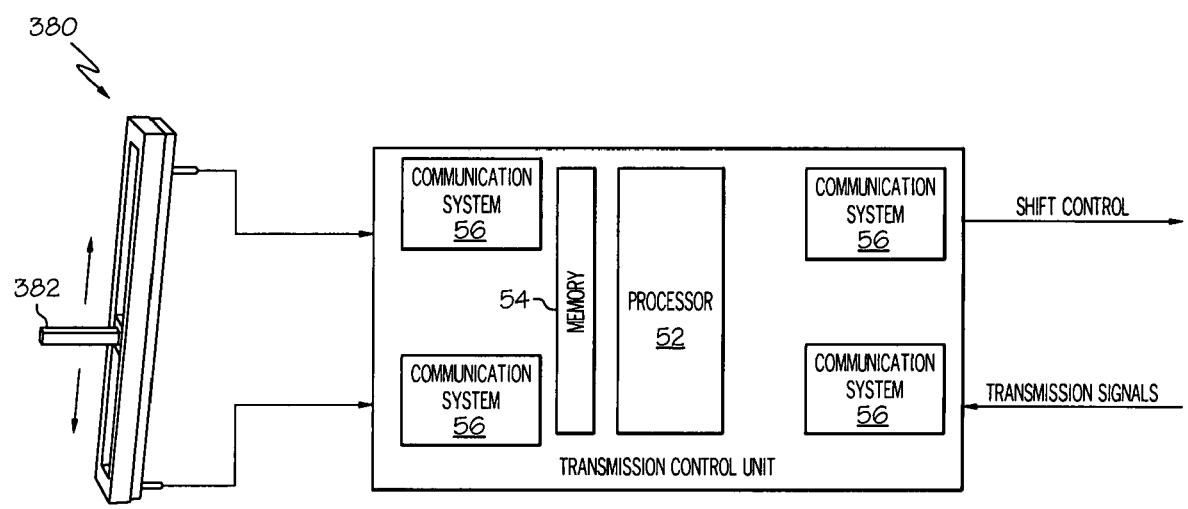
FIG. 7 is a top view of an in-line transmission shift point selector system in accordance with one illustrative embodiment of the present invention.

As illustrated by FIGS. 5A & 5B, selector 80 may be a rotary potentiometer 180 and may be communicatively connected to transmission control unit 32. Potentiometer 180 may comprise a selecting member 182 to provide user-control of the output of potentiometer. A user may rotate selecting member 182 to vary the output of the potentiometer 180. In one embodiment, the output of potentiometer 180 increases proportionally as the selecting member is rotated clockwise. As illustrated by FIGS. 6 and 7, selector 80 may be a linear slide potentiometer 280, 380 and may be communicatively connected to transmission control unit 32. Potentiometer 280, 380 may comprise a selecting member 282, 382 to provide user-control of the output of potentiometer. A user may slide selecting member 282, 382 to vary the output of the potentiometer 280, 380. In one embodiment, the output of potentiometer 280, 380 increases proportionally as the selecting member is rotated clockwise.

As illustrated in FIGS. 2-7, selector 80 may communicate with transmission control unit 32 using the particular communication methods and forms discussed for transmission control unit 32 below. Accordingly, selector 80 may be connected to transmission control unit 32 according to the particular communication method implemented. For instance, selector 80 may communicate using fiber-optic communication and therefore may be wired to transmission control unit 32 with fiber-optic cabling. Additionally, selector 80 may be affixed in any location that would provide a user access and would accommodate the particular communication method implemented. In one embodiment, selector 80 may be affixed within a vehicle compartment and communicatively connected to transmission control unit 32 using communication wire routed through the vehicle. In another embodiment, selector 80 may be portable and connected to transmission control unit 32 using wireless communication such that a user may select any location. It should be understood that selector 80 may be communicatively connected with other systems that support the employment of selector 80 in transmission control such as an Electronic Control Unit, a Telematics Control Unit or the like.

Figure 9:
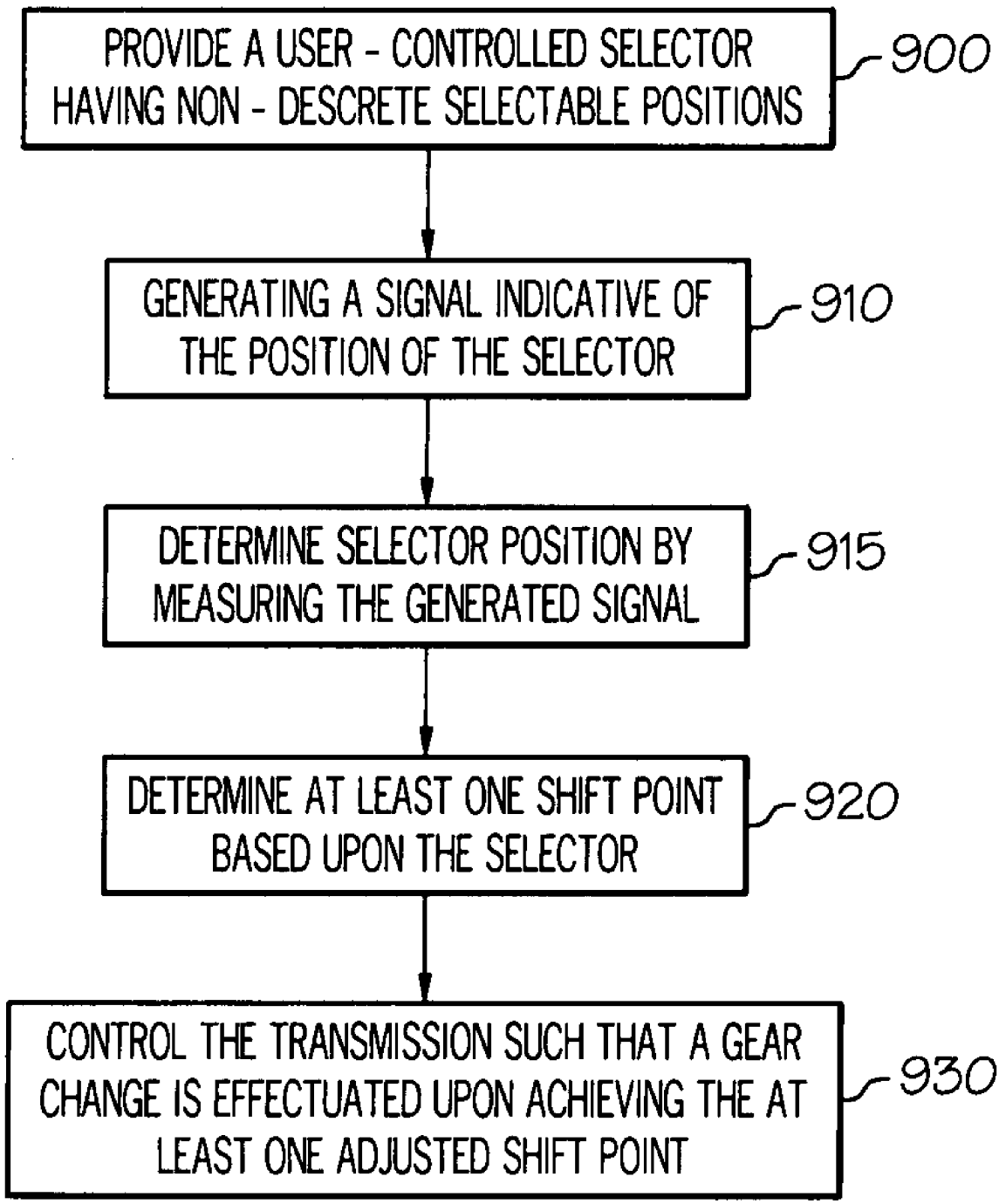
FIG. 9 is a flowchart of one method of controlling a vehicle transmission having at least one shift point in accordance with one embodiment of the present invention.
Figure 10:
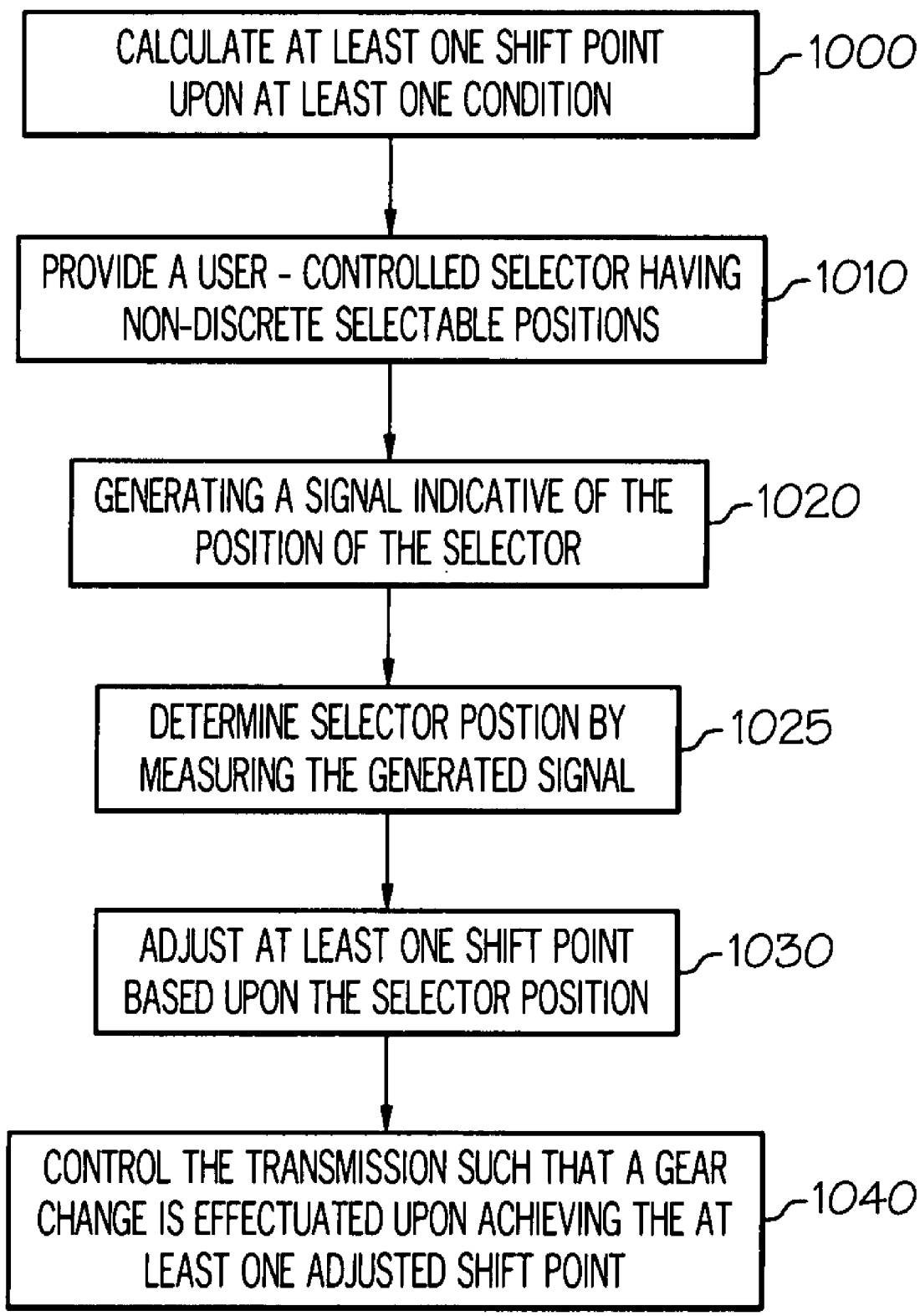
FIG. 10 is a flowchart of selecting a shift point in accordance with one embodiment of the present invention.

As illustrated in blocks 900 and 1010 of FIGS. 9 and 10, selector 80 may be provided to permit a user, at any time, to control the limits upon which a shift point is selected and thereby change vehicle performance. As further illustrated in blocks 910 and 1020, a signal may be generated that is indicative of the position of selector 80. Typically, a selector may provide a range of positions that correlate to an output range. The position of the selector along that range may generate particular output signals. Therefore as illustrated by block 915 and 1025, the output range may be identified by transmission control unit 32 and the selector position may be determined by measuring the generated signal. In one embodiment where a change in the position of the selector is proportional to a change in the output, the position of the selector may proportionally correspond to the output signal. For instance, if the position of the selector is at 60% of the full range of selector positions, the output signal generated may be 60% of the full output range. If the position of the selector thereby changes to 80% of the full range, the output signal generated may change to 80% of the full output range. In another embodiment where a change in the position of the selector is inverse to a change in the output, the position of the selector may inversely correspond to the output signal. For instance, if the position of the selector is at 30% of the full range of selector positions, the output signal generated may be 70% of the full output range. If the position of the selector thereby changes to 80% of the full range, the output signal generated may change to 20% of the full output range. Other embodiments are of course contemplated with different proportions and other position/output relationships than those described above.

The outputs of selector 80 may be any unit of measure and any given range identified within transmission control unit 32 as corresponding to transmission shift point adjustment. In one embodiment, transmission control unit 32 may identify transmission shift point adjustment based upon a voltage signal. In such an embodiment, selector 80 may be a device having a user-controlled, infinite gradational impedance. Current may be applied to selector 80 and the resulting voltage signal may be measured by transmission control unit 32 to determine the position of the selector. In another embodiment, transmission control unit 32 may identify transmission shift point adjustment based upon a current signal. In such an embodiment, selector 80 may be a device having a user-controlled, infinite gradational impedance. Voltage may be applied to selector 80 and the resulting current signal may be measured by transmission control unit 32 to determine the position of the selector. In yet another embodiment, transmission control unit 32 may identify a transmission shift point adjustment based upon a change in binary digits. In such an embodiment, selector 80 may be a device having a user-controlled digital output that provides substantial gradation such as a linear rotary encoder or a linear slide encoder. Voltage may be applied to selector 80 and the binary digits may be measured by transmission control unit 32 to determine the position of the selector. In such an embodiment, sufficient gradation of the digital output may be achieved by providing adequate sampling within a range. For instance, the binary output of selector 80 may be provided binary placeholders such that the output of selector 80 may increment through a large number of possible digital outputs (e.g., a range of 0-4096) as the position of the selector 80 is increased. Such sampling of the output may provide adequate gradation to allow a user to precisely select a particular output. It should be understood that the specifications of selector 80 (i.e., range, input, output, etc.) are not limited to the embodiments disclosed above and may correspond to the device chosen or the system into which selector 20 is implemented. Moreover, selector 20 may be any non-electrical device that provides a user with infinite adjustable control of an output such as an adjustable strain gauge, an adjustable mechanical-pneumatic valve, an adjustable optical gauge, a thermocouple or any similar device now known or hereafter developed.

Accordingly and as illustrated in block 920 of FIG. 10, shift points may be determined based upon the position of the selector and irrespective of any shift point calculation based upon vehicle conditions. In one embodiment, selector 80 may be provided to allow a user to select the speed at which a transmission shifts. Irrespective of any speed based shift point calculation by transmission control unit 32, the transmission 22 may change gears when the vehicle reaches the particular speed designated by the selector 80. In another embodiment, selector 80 may be provided to allow a user to select the pedal depression upon which a transmission shifts. Irrespective of any pedal depression based shift point calculation by transmission control unit 32, the transmission 22 may change gears when the vehicle reaches the particular pedal depression as designated by the user.

Accordingly and as illustrated in block 1030 of FIG. 10, subsequent to a shift point calculation, shift points may be adjusted based upon the position of the selector. In an embodiment where shift points may be calculated based upon vehicle speed, a user may control selector 80 to adjust the particular speed associated with a shift point. For instance, if a user increases the position of selector 30, a shift point may be adjusted to shift transmission at a higher speed than the speed designated by a particular shift point calculation. In another embodiment, where shift points may be calculated based upon vehicle acceleration and pedal depression, a user may control selector 80 to adjust the particular pedal depression associated with a shift point. For instance, if a user decreases the position of selector 80, a shift point may be adjusted to shift transmission with less pedal depression than the pedal depression designated by a particular shift point calculation. In yet another embodiment, where shift points may be calculated based upon vehicle traction, a user may control selector 80 to adjust the particular wheel permitted according to a shift point. For instance, if a user increases the position of selector 80, a shift point may be adjusted to shift transmission with more permissible wheel slip than the wheel slip designated by a particular shift point calculation.

As explained above and as illustrated in block 930 and 1040 of FIGS. 9 and 10, transmission 22 may change gears based upon the user-selected shift point, provided the selected shift point falls within the design limits of the transmission. Accordingly, user-controlled shift points may be applied to transmission gear ratios selectively, entirely or in any other order. In one embodiment, the user-controlled shift point may be applied to each transmission gear ratio. In another embodiment, the user-controlled shift point may be applied to one particular transmission gear ratio. In another embodiment, the user-controlled shift point may be applied to particular transmission gear ratios. Typically, a user may select the particular gear ratios to be affected by the user-controlled shift point. To provide such user selection, additional controls may be provided to the transmission control module 32. Such controls may be provided within selector 80, separate from selector 80, as part of the logic of transmission control module 32 or in any manner to provide controls to a user now known or hereafter developed. It should be understood of course, that control systems, processors, logic circuits or the like may be configured to also select the gear ratios affected by the user-controlled shift points.

The correlation of selector output values to shift points may be made using calculation/selection methods now known or hereafter developed. In one embodiment, shift points may be determined using algorithms that associate selector output values to shift points. In another embodiment, shift points may be determined using a predefined lookup table that associates selector output values to shift points. In such embodiments, algorithms, selection tables and the like may be defined according to particular designs and/or configurations. Accordingly, shift points may be determined by any arithmetic operator (i.e., a processor, etc.) or may be selected from data stored upon any memory device (i.e., RAM, CD drive, etc.).

The above methods and algorithms can be implemented using a variety of computer or electronic systems having one or more processors, controllers, or circuitry for execution of code, instructions, programs, software, firmware, and the like for carrying out the desired tasks.

The foregoing description of the various embodiments of the invention has been presented for the purposes of illustration and description. It is not intended to be exhaustive or to limit the inventions to the precise forms disclosed. Many alternatives, modifications and variations will be apparent to those skilled in the art of the above teaching. For example, the system for regulating engine variables in accordance with the present invention may establish a set point, evaluate actuator control inputs which result in a given variable setpoint, generate an optimal actuator input setting and control an actuator with the optimal input setting. Accordingly, while some of the alternative embodiments of the system for regulating engine variables have been discussed specifically, other embodiments will be apparent or relatively easily developed by those of ordinary skill in the art. Moreover, although multiple inventive aspects and features have been described, it should be noted that these aspects and features need not be utilized in combination in any particular embodiment. Accordingly, this invention is intended to embrace all alternatives, modifications, combinations and variations.

What is claimed is:

1. A method for controlling a vehicle transmission having at least one shift point, comprising:
    providing a user-controlled selector having non-discrete selectable positions;
    generating a signal indicative of the position of the selector;
    determining at least one transmission shift point based upon the selector position and irrespective of any vehicle conditions; and
    controlling a vehicle transmission such that a gear change is effectuated upon achieving the at least one adjusted shift point.

2. The method as recited in claim 1, wherein the selector comprises at least one of a rotary potentiometer, a linear slide potentiometer, a rotary encoder, or a linear slide encoder.

3. The method as recited in claim 1, wherein the shift point represents a vehicle parameter to be used for shifting between vehicle gears in an automatic transmission system.

4. The method as recited in claim 3, wherein the parameter comprises at least one of vehicle speed, rotational velocity, pedal depression or engine torque.

5. The method as recited in claim 4, wherein the transmission is further controlled based upon the throttle position.

6. The method as recited in claim 1, wherein the selector is not limited to discrete selection positions.

7. The method as recited in claim 1, wherein the selector has continuously variable selectable positions within a given range.

8. A method for selecting a shift point, comprising:
    calculating at least one transmission shift point based upon at least one vehicle condition;
    providing a user-controlled selector having non-discrete selectable positions;
    generating a signal indicative of the position of the selector; and
    adjusting the calculated shift point based upon the selector position and irrespective of any vehicle conditions.

9. The method as recited in claim 8, wherein the selector comprises at least one of a linear rotary potentiometer, a linear slide potentiometer, a linear rotary encoder, or a linear slide encoder.

10. The method as recited in claim 8, wherein generating a signal indicative of the position of the selector comprises applying current to the selector and generating a voltage signal corresponding to the position of the selector.

11. The method as recited in claim 8, wherein the at least one vehicle condition is based upon a throttle position.

12. The method as recited in claim 8, wherein adjusting at least one shift point further comprises delaying a shift point.

13. The method as recited in claim 8, further comprising controlling the state of a valve when the vehicle operating conditions indicate the shift point has been reached and effectuating a gear change in response to the change in state.

14. The method as recited in claim 8, wherein the selector has continuously variable selectable positions within a given range.

15. A system for controlling at least one shift point of a transmission comprising:

a transmission having gears and being configured to respond to at least one shift point for effectuating an automatic gear change;

a controller operable to establish the at least one shift point and to control the transmission such that the gear change is effectuated upon achieving the at least one shift point; and a user-controlled selector configured to allow the user to adjust at least one shift point of the controller, wherein the selector has non-discrete selectable positions and the controller is operable to adjust the at least one shift point based upon a position of the selector and irrespective of any vehicle conditions.

16. The system as recited in claim 15, wherein the selector comprises at least one of a linear rotary potentiometer, a linear slide potentiometer, a linear rotary encoder, or a linear slide encoder.

17. The system as recited in claim 15, wherein the controller is further operable to establish the at least one shift point based upon a vehicle condition.

18. The system as recited in claim 15, wherein the selector has selectable positions within a given range.

19. The system as recited in claim 15, wherein the controller is operable to control the state of a valve when the vehicle operating conditions indicate the shift point has been reached and wherein the transmission is configured to respond to the change in state and a gear change is effectuated in response thereto.

* * * * *